United States Patent [19]

Beil

[11] 3,833,809

[45] Sept. 3, 1974

[54] NEUTRON LOGGING OF FORMATION POROSITY AND CHLORINITY

[75] Inventor: Ralph G. Beil, Houston, Tex.

[73] Assignee: Schlumberger Technology Corporation, New York, N.Y.

[22] Filed: May 9, 1973

[21] Appl. No.: 358,601

Related U.S. Application Data

[63] Continuation of Ser. No. 126,750, March 22, 1971, abandoned.

[52] U.S. Cl............................... 250/270, 250/262
[51] Int. Cl............................................. G01v 5/00
[58] Field of Search .......... 250/261, 262, 264, 269, 250/270

[56] References Cited
UNITED STATES PATENTS

| | | | |
|---|---|---|---|
| 2,914,677 | 11/1959 | Arnold | 250/270 |
| 2,991,364 | 7/1961 | Goodman | 250/262 |
| 2,994,776 | 8/1961 | Mott | 250/269 |
| 3,164,720 | 1/1965 | Armistead | 250/270 |
| 3,379,882 | 4/1968 | Youmans | 250/264 |
| 3,461,291 | 8/1969 | Goodman | 250/262 |
| 3,509,342 | 4/1970 | Dewan | 250/264 |
| 3,529,160 | 9/1970 | Moran | 250/262 |
| 3,566,116 | 2/1971 | Nelligan | 250/262 |
| 3,621,255 | 11/1971 | Schwartz | 250/262 X |
| 3,706,884 | 12/1972 | Youmans | 250/261 |

Primary Examiner—Archie R. Borchelt
Attorney, Agent, or Firm—Brumbaugh, Graves, Donohue & Raymond

[57] ABSTRACT

An embodiment of the invention shows a pulse neutron technique for measuring earth formation porosity. For example, the inelastic neutron scattering gamma radiation emitted from a formation in a broad energy range provides a measure of the porosity in a way that is free of formation fluid and matrix composition influences. Preferably, the inelastic scattering gamma rays characterizing this measurement are observed in a 10 microsecond interval that is initiated during an early part of each neutron pulse. The observed inelastic scattering gamma ray activity is normalized to compensate for variations in neutron source strength. The normalized data then is converted directly into a formation porosity output.

28 Claims, 2 Drawing Figures

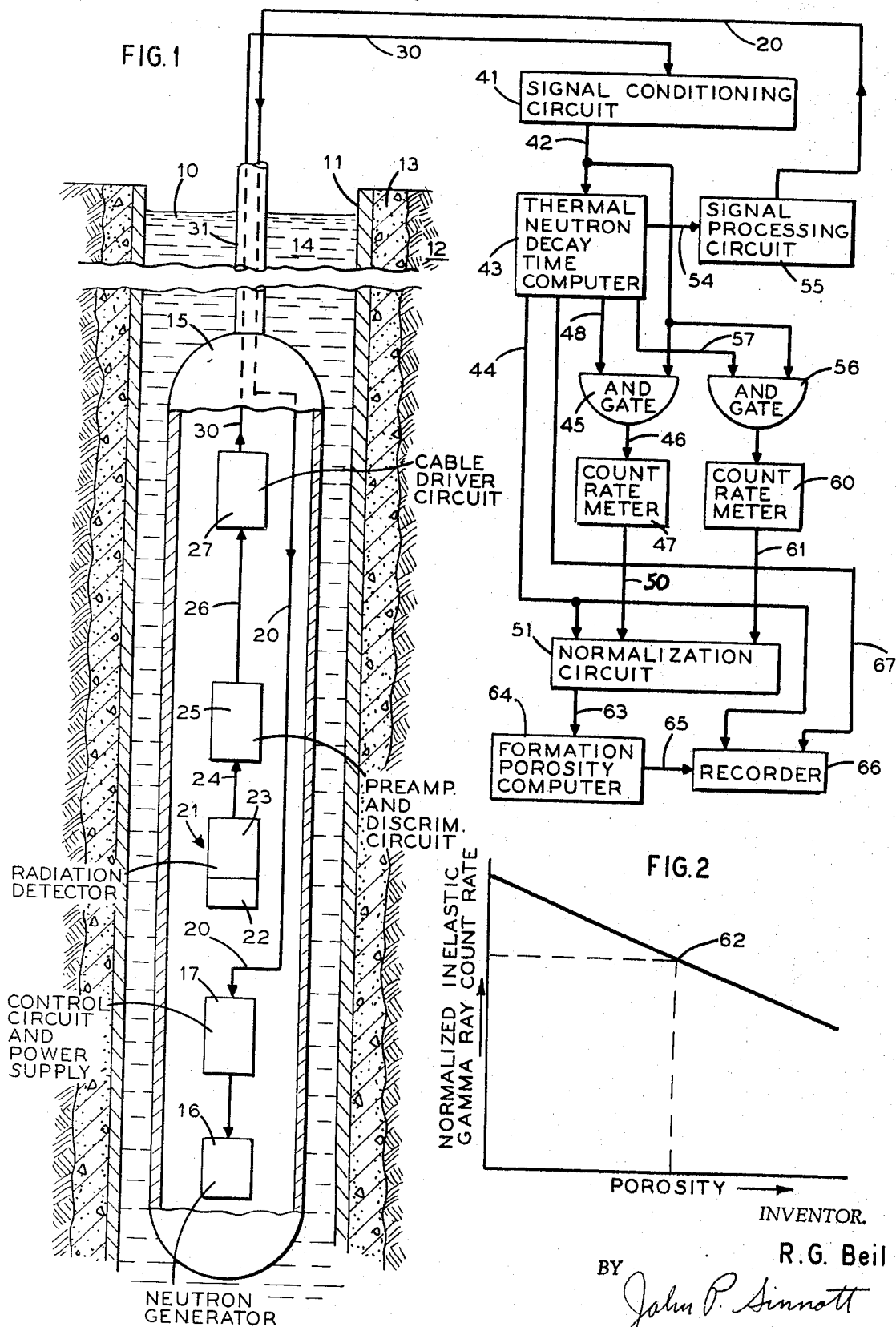

3,833,809

NEUTRON LOGGING OF FORMATION POROSITY AND CHLORINITY

This is a continuation, of application Ser. No. 126,750 filed Mar. 22, 1971, and now abandoned.

BACKGROUND OF THE INVENTION

1. Field of the Invention

This invention relates to pulse neutron techniques and more particularly, to a well logging system for measuring earth formation porosity through inelastic neutron scattering gamma rays, and the like.

2. Description of the Prior Art

Commercially interesting accumulations of oil and gas usually are found in porous earth formation structures. Consequently, the need to measure formation porosity or porosity's correlative, hydrogen concentration, is of substantial industrial importance.

This need for accurate porosity measurement is even more pressing if the high cost of exploratory drilling is contrasted with the incomplete knowledge of the earth formations traversed by many existing boreholes. The problem of exploiting the full production potential of these existing wells, however, is difficult. For example, most producing wells are "completed" with a cement annulus that is set between one or more strings of steel casing and the formation. Clearly, the steel casing and the usually irregular cement annulus impose a formidable physical barrier to any attempt to observe the adjacent formation. Neutron techniques offer perhaps the best possibility for accurate investigation in these circumstances. The high energy neutrons emitted from an accelerator, for instance, have a low absorption probability, or "cross section," in the environment immediately surrounding the logging tool. In this high energy state, the neutrons will have a reasonable chance to pass through the borehole casing materials and react ultimately with some of the nuclei of the formation constituents.

In order to conduct these neutron measurements, a fluid tight housing, or sonde is drawn through the borehole at the end of a shielded cable. An accelerator within the sonde emits discrete bursts of neutrons at timed intervals. The energies of the emitted neutrons are degraded through collisions with the nuclei of the environmental constituents. In response to these collisions, the nuclei emit "inelastic gamma rays." This inelastic gamma radiation, however, occurs within the order of microseconds after neutron emission and terminates very swiftly after the neutron pulse has ended.

Proposals have been advanced to exploit specific inelastic gamma rays in order to identify particular elements within an earth formation. Illustratively, isotopes of carbon and oxygen each emit inelastic gamm rays with characteristically distinct energies. A logging tool according to this suggestion detects the gamma ray intensities within narrow ranges that encompass the energies which are unique to the elements under study. The observed activity levels in these narrow energy bands should provide some indication of the relative abundance of these materials in the earth formation. It must be noted, however, that this sort of analysis fails to provide information with respect to the formation porosity.

The neutrons generally lose initial emission energies through the scattering process and reach an average energy that is in thermal equilibrium with the molecular structure of the earth formation. In this condition some of the nuclei absorb the "thermalized" neutrons and emit characteristic gamma radiation through a process known as "radiative capture." Because the absorption probability in chlorine is quite high relative to other typical earth formation elements, the gamm radiation from saline formation water quickly tends to become a dominant effect. Accordingly, some measure of the chlorine or salt water concentration in the earth formation pores can be obtained by observing the rate at which the neutrons are absorbed.

A need still exists to identify formation porosity in adverse well conditions, as, for instance through a cased borehole. The formation porosity and chlorine data combination, moreover, is a commercially attractive goal inasmuch as a relative absence of salt water in a porous formation usually indicates an oil-bearing earth structure. Porosity measurements through casing, however, ordinarily require a separate logging system with a sonde or downhole probe that has characteristics which are substantially different from those hereinbefore described.

In order to obtain a set of these chlorine and porosity logs, a well must be taken out of production for the time needed to "run" two separate logging tools. This lost production time imposes a significant financial burden to the well operator. Accordingly, a further need exists for one logging system that will provide a reliable indication of formation porosity and fluid salinity in spite of the borehole environment.

SUMMARY OF THE INVENTION

The invention largely satisfies this and other industrial needs through the observation of the inelastic gamma rays that are generated within the formation during the initial portion of each neutron pulse. It has been found that the inelastic neutron scattering gamma rays that are emitted from the earth formation during the early part of the neutron pulse, in the time before thermal neutron absorption effects attain dominance, generally reflect porosity without mineral or undesired fluid composition effects.

In this connection, it has been concluded that the hydrogen in the formation fluid is a major factor in inhibiting inelastic gamma ray emission during the early part of the neutron pulse. Inasmuch as hydrogenous matter, water or hydrocarbon for instance, usually fills the formation pores, a relation exists between hydrogen concentration and formation porosity. Because the mass of the hydrogen nucleus, or the "proton," is about the same as the mass of a neutron, there is a maximum energy transfer from a colliding neutron to a proton "target" relative to other, larger nuclear targets. Consequently, hydrogen is a very efficient material for slowing down neutrons to a level of thermal equilibrium with the formation constituents. It follows in accordance with a characteristic of the invention, that the more hydrogenous formations tend to produce relatively less inelastic neutron scattering gamma rays due to the fact that the high energy neutron population is reduced more quickly. The hydrogen, moreover, occupies a volume within the formation that otherwise would accommodate other elements, thus further reducing the relative abundance of inelastic collisions. This latter effect is further increased because the inelastic cross sections for all other elements commonly found in formations are higher than that of hydrogen.

By means of comparative tests taken in formations with known porosities, a scale of formation porosity as an inverse function of inelastic gamma ray count rate can be established. This data may provide a basis for automatically converting an observed level of inelastic scattering gamma ray activity into a value that is related to the actual formation porosity. Preferably, this activity is observed close to the beginning of the neutron pulse and before most of the neutrons have been thermalized in order to prevent capture gamma rays from degrading or overwhelming inelastic gamma ray observation.

More specifically, one aspect of the invention enables a pulse neutron logging system to measure formation porosity as well as thermal neutron absorption time or chlorine concentration. Illustratively, the neutron pulse duration, or pulse width, is functionally related to the thermal neutron absorption characteristics of the adjacent earth formation. For example, a suitable pulse width is one that is equal to the time required for the earth formation thermal neutron population to decrease by a factor of $1/e$, where $e$ is the base of the natural logarithm and is equal to about 2.71. This interval often is referred to as the "thermal neutron decay time," $\tau$.

To observe the inelastic scattering gamma rays without submitting to a substantial capture gamma radiation background, it has been found preferably to register the gamma ray detector signals during the first 10 microseconds ($10\mu sec$) or less of the neutron pulse. For best results, the radiations under observation are in a band of energies that extend from about 0.5 MeV to 7 MeV. The wide energy band that characterizes this invention is, moreover, in sharp contrast to the prior art which has been directed to narrow band observation in order to identify the activity peaks associated with different elements. The cross sections for inelastic gamma production for various borehole elements are about the same when averaged over a broad range of neutron energies, say 0.5 to 14 MeV. Experimental results for Si, Ca, Mg, S, Al, C, Fe, O, Cl, and Na show some line structure, but the overall inelastic gamma production for these elements is fairly constant. This means that the total inelastic gamma count rate should not depend significantly on either matrix composition or on the formation fluid.

The inelastic gamma ray activity during the observation interval at the beginning of the neutron burst is, in general, proportional to the output from the neutron generator or accelerator. This proportionality causes the observed inelastic gamma ray activity to reflect not only porosity but also to some extent, unpredictable shifts in the operation of the neutron generator. These undesirable biases in the porosity signal can be eliminated through any of a number of ways. For example, "normalization" through division of the signal in question by a quantity that is not porosity related, but is, however, subject to variations with neutron production often is an effective correction procedure. For example, the counts registered during an interval soon after the termination of the neutron pulse, could provide a suitable divisor for this purpose. Alternatively, capture gamma radiation counts that are registered within the neutron burst also can provide an acceptable normalizing divisor.

Ultimately, the normalized inelastic gamma ray signal can be contrasted with preestablished data in a computation circuit in order to generate an output that indicates the earth formation porosity. The thermal neutron decay time, $\tau$, that also is obtained through this tool as a part of the pulse neutron cycle, is determined in a way that is described for example in U.S. Pat. No. 3,566,116, granted to William B. Nelligan on Feb. 23, 1971 for "Methods and Apparatus for Measuring Neutron Characteristics of a Material." The value of $\tau$, measured in the foregoing manner, establishes an accurate indication of the chlorine or salt water concentration. The formation porosity, measured in accordance with the principles of this invention, is acquired with the same tool and on the same logging run through a more efficient use of the information available in each cycle of pulse neutron tool operation than that which heretofore has been available to the industry. In this way, valuable industrial data can be provided at lower cost.

For a better understanding of the present invention together with other and further objects thereof, reference is had to the following description taken in connection with the accompanying drawing, the scope of the invention being pointed out in the appended claims.

BRIEF DESCRIPTION OF THE DRAWING

FIG. 1 is a schematic diagram of an exemplary logging tool for use in connection with the invention; and FIG. 2 is a representative graph of the physical effect that characterizes the invention.

DESCRIPTION OF THE PREFERRED EMBODIMENTS

For a more complete appreciation of the invention, FIG. 1 shows a typical borehole 10 lined with steel casing 11 that is joined to an earth formation 12 through a cement annulus 13. The borehole 10, moreover, is filled with fluid 14 to control the hydrostatic pressure within the earth formation 12 during drilling and subsequent oil production.

A logging tool suitable for use in connection with the invention, is shown within the borehole 10. Typically, the tool comprises a fluid and pressure-tight housing 15. A neutron generator 16 is enclosed in the lowermost portion of the housing 15. A control circuit and power supply 17 regulate the neutron pulse duration and repetition rate of the generator 16 and provide the necessary power for generator operation. Power and control signals for the neutron generator 16 are sent from the earth's surface to the control circuit 17 through a conductor 20. Preferably, the neutron generator 16 is able to reach maximum output in about $5\mu sec$ after the pulse is initiated.

A radiation detector 21, the center of which is spaced vertically about 10 inches to 15 inches from the target (not shown) in the neutron generator 16, preferably comprises a phosphor, for example, a sodium-iodide scintillation crystal 22, that is optically coupled to a photomultiplier tube 23.

A preamplifier and discriminator circuit 25 produces electrical signals in response to the output electrical charge pulses in a conductor 24 that were generated by the photo-multiplier tube 23. These pulses, moreover, are proportional to the energies of the respective radiations that caused the initial light flashes. The preamplifier prepares the signals for further manipulation within the system and the discriminator establishes a minimum signal amplitude that must be exceeded before the pulses are further processed in order to eliminate background noise and other extraneous signals. These processed detector signals are sent through a conductor 26 to a cable driver circuit 27 which codes, time division multiplexes or otherwise prepares the signals for transmission to the earth's surface. The encoded signals are coupled to a conductor 30 in an armored cable 31 for transmission up the borehole 10. The armored cable 31 provides an insulated matrix for the conductor 30 and also enables a winch mechanism (not shown) to move the housing 15 vertically through the borehole 10.

Although the circuits to be described subsequently are shown in the illustrative embodiment near the borehole 10 on the earth's surface, it should be noted that all or part of these circuits can be enclosed in the tool housing 15 or located at a central computation facility in order to respond to transmitted or recorded and stored logging tool signals.

Continuing with the description of the specific illustration, the detector signals in the conductor 30 are received in a signal conditioning circuit 41. The conditioning circuit 41 preferably eliminates noise acquired during transmission, regenerates the cable signals and decodes or demultiplexes these signals for further processing.

The detector signals are sent from the conditioning circuit 41 through a conductor 42 to a thermal neutron decay time computer 43. A thermal neutron decay time computer of a type suitable for use in connection with this invention is described in more complete detail in U.S. Pat. No. 3,566,116. Briefly, the computer 43 measures the rate of thermal neutron absorption within the formation 12 during a first interval of $\tau$ duration that commences about two decay times after the termination of the neutron pulse. A second interval is identified immediately after the first interval. The duration of the second interval, however, is equal to about two decay times. After background radiation subtraction, it has been found that the number of counts in the first observation interval is equal to twice the number of counts in the second interval, if the intervals indeed are multiples of the formation thermal neutron decay time. The computer 43 responds to departures in the observed counts from the preferred ratio by converting these departures into error signals that adjust the first and second observation intervals until the predetermined relationship is achieved.

Gate enabling pulses that correspond to the thermal neutron decay time which occurs two intervals after the end of the neutron pulse are sent from the thermal neutron decay computer 43 through a conductor 44 to a subsequently described normalization circuit 51 and a recorder 66. An "AND" gate 45 responds to the simultaneous arrival of detector counts in the conductor 42 and a gate enabling pulse in a conductor 48 that is received from the thermal neutron decay computer 43. The gate 45 passes those counts that occur during the first 10 micro-seconds of each neutron pulse through a conductor 46 to a count rate meter 47. The count rate meter 47 converts the gated detector signals into an output signal in a conductor 50 that corresponds to detector counts per unit time e.g., counts per second. In accordance with the invention, the detector count rate signal from the meter 47 is received in the normalization circuit 51. The normalization circuit compensates for the influence of fluctuations in the output from the neutron generator 16 and the formation thermal neutron decay time on the detector count rate signal as described subsequently in more complete detail.

In a preferred embodiment of the invention, the generator 16 produces pulses of neutrons which are of $\tau$ duration. The generator is operated in response to an output from the thermal neutron decay time computer 43 that is associated with the radiation detector 21. These neutron bursts moreover, occur in repetitive cycles. These cycles are $10\tau$ intervals in length. Signals that regulate the generator 16 and cause it to produce neutrons in this pulse sequence, are sent from the thermal neutron decay computer 43 through a conductor 54 to a signal processing circuit 55. The circuit 55 prepares the control signals for transmission in the conductor 20 within the armored cable 31 to the control and power supply circuit 17 in the downhole housing 15.

An "AND" gate 56 responds to enabling signals from the computer 43 in order to pass detector signals in the conductor 43 during the measuring period that commences at a time equal to $2\tau$ after the preceeding neutron pulse has subsided. These enabling signals are sent from the computer 43 to the gate 56 through a conductor 57. When enabled, detector signals in the conductor 42 are registered in a count rate meter 60. The meter 60 converts the counts into a signal that corresponds to counts per unit time, scaled to the same time base as the count rate meter 47.

The detector count rate from the meter 60 is coupled to the normalization circuit 51 through a conductor 61. The normalization circuit shown in this specific example of the invention includes a means for computing the ratio of the $\tau$ gate count rate signal to the inelastic gamma count rate, the latter rate having been held or stored in a memory circuit (not shown) during the first $10\mu sec$ or less of the neutron pulse. As will be apparent, the inelastic gamma count rate must be transferred from storage to the ratio computation means in timed relationship with the $\tau$ gate count rate signal. The gate enabling pulses sent to the normalization circuit 51 through conductor 44 may be used for this purpose. As previously mentioned, these gate enabling pulses correspond to the neutron decay time occurring $2\tau$ after the end of the neutron burst, and thus are coincident in time with the measuring period for the $\tau$ gate count rate from the meter 60.

The output signal from the normalization circuit 51, which corresponds to the ratio of the aforementioned count rates, is sent through a conductor 63 to a formation porosity computer 64.

Turning to FIG. 2, an illustrative diagram shows a typical relation between a normalized inelastic gamma ray count rate signal and the porosity of an earth formation. A point 62 is identified for the purpose of illustration on the graph shown in FIG. 2. The point 62 uniquely distinguishes a specific earth formation porosity that is largely independent of matrix effects and borehole environment characteristics.

Turning once more to FIG. 1, as hereinbefore mentioned, the normalized signal from the circuit 51 is coupled through the conductor 63 to the porosity computer 64. The computer 64 is characterized by an electrical response similar to that shown in the FIG. 2 graph. The actual computation system for generating the appropriate response can relay on any suitable technique. For example, a function former circuit is adequate for the purpose of the invention. A circuit of this sort usually includes an operational amplifier and a diode-resistor feedback network. In operation, the feedback network produces an overall circuit output that provides a response to input signals that matches the graph shown in FIG. 2.

The output signal from the porosity circuit 64, which corresponds to the porosity or hydrogen concentration of the earth formation 12, is sent through a conductor 65 to the recording device 66, which prepares a log of the computed porosity as a function of the depth of the housing 15 within the borehole 10. This record can be prepared in a form suitable for visual inspection, stored for further processing at some future time or, for instance, transmitted to a central computation facility.

The thermal neutron decay times computed in accordance with the gamma radiation observed through the thermal neutron decay time computer 43 also are sent through a cable 67 to the recorder 66. To provide a check on the operation of the system, it might be further desired to record the actual detector counts that are passed through the signal conditioning circuit, although this connection is not shown in FIG. 1.

In operation, the housing 15 is lowered into the borehole 10 to a predetermined depth. The neutron generator 16 is energized to emit timed pulses of neutrons as the tool is drawn upwardly toward the earth's surface. The initial gamma radiation emitted from the formation in response to the first part of the neutron pulse is largely attributable to inelastic collisions between neutrons and the nuclei of the earth formation constituents. Because maximum neutron production from the generator 16 is not attained for a finite time after the pulse is initiated, but preferably within the first 5$\mu$sec of neutron production, it may be preferable to delay the inelastically scattered gamma ray observation interval to some slightly later time within the pulse, according to the generator and pulse characteristics. This delay, if necessary, can be determined through experiments in test formations or in formations with known porosities.

Continuing with the description, the detector 21, spaced several inches from the target in the neutron generator 16, responds to the inelastically scattered gamma rays by producing signals that are sent to the earth's surface in a conductor 30. During the latter portion of the neutron pulse, and in the first two thermal neutron decay times after the termination of the neutron pulse, the gamma radiation registered by the detector 21 generally reflects the thermal neutron absorption properties of the borehole fluid 14, the steel casing 11 and the cement annulus 13. Although the normalizing signal is drawn from the detector counts that occur in the first decay interval after these transients have subsided, it may be desirable to use all of the capture gamma ray signal that occurs during an entire operational cycle, or, perhaps, only those registered within the entire neutron burst.

On the earth's surface, regenerated detector signals are processed to compute the thermal neutron decay time of the formation in accordance with the detector observations. These signals, however, are further divided in order to isolate the inelastic gamma ray signals that are observed through the detector 21 during the 10$\mu$sec or less period of time that occurs early in the neutron pulse. The detector signal that is to be used as a normalization divisor also is isolated and is applied to the normalization circuit 51. Through the division which is illustrative of the normalization process, a signal is produced that is related to the inelastically scattered gamma radiation activity in a way that is independent of the influences of the output from the neutron generator. In this manner, the normalized signal can be converted into another signal that directly identifies the porosity of the earth formation 12 in spite of the borehole environment.

It should be noted that the invention is not limited to the specific technique described above. In particular, the invention could easily be adapted to a pulsed neutron tool in which more than one radiation detector is used. A salient feature of the invention, however, is found in the observation of the inelastic neutron scattering gamma radiation during a very early part of the neutron burst in order to reduce or eliminate radiative capture effects. In further illustration of the principles of the invention, a broad band of inelastic scattering gamma rays, typically in the range of 7 MeV down to about 0.5 MeV is used in order to measure porosity. This latter feature of the invention is clearly distinguished from the prior art which suggested observing inelastic gamma rays in very narrow energy bands to identify activity peaks that characterize individual elements.

I claim:

1. A system for observing earth formation properties comprising:

means for irradiating the earth formation with a pulse of high energy neutrons;

means for detecting over a broad energy band gamma radiation produced by the inelastic scattering of said neutrons by nuclei of the formation elements during an interval of 10 $\mu$sec or less in the early part of said neutron pulse and for producing an output signal in response thereto; and circuit means for converting said inelastic gamma ray output signal, according to a predetermined relationship relating such inelastic gamma radiation signals to the hydrogenous matter content of earth formations, to provide an output signal indicative of a characteristic of the formation under observation.

2. A system according to claim 1 wherein said inelastic gamma radiation output signal producing means is responsive to inelastic gamma radiation over an energy band of from about 0.5 Mev to about 7.0 Mev.

3. A system according to claim 1 wherein said inelastic gamma radiation output signal producing means comprises a radiation detector spaced several inches from said neutron irradiating means.

4. A system according to claim 1 wherein said formation characteristic is porosity.

5. A system according to claim 1 wherein said circuit means comprises means for compensating said inelastic gamma radiation output signal for variations therein not related to the hydrogenous matter content of the formation.

6. A system according to claim 5 wherein said compensating means compensates said inelastic gamma radiation output signal for fluctuation in the output of said neutron irradiating means.

7. A system according to claim 6 wherein said compensating means comprises normalizing means for generating a signal that is related to the output of the neutron irradiating means in order to normalize said inelastic gamma ray signal.

8. A method for observing earth formation properties comprising the steps of:
irradiating an earth formation with a pulse of high energy neutrons;
observing over a wide energy band the gamma radiation produced by inelastic scattering of said neutrons by nuclei of the earth formation during an interval of not more than 10 μsec early in the neutron pulse and generating an output signal in response thereto;
observing the gamma radiation produced by the capture of thermal neutrons during a period that commences about two thermal neutron decay times after the termination of said neutron pulse and generating an output signal in response thereto;
normalizing said inelastic gamma radiation output signal in accordance with said observed thermal neutron radiation signal to provide a normalized inelastic gamma radiation signal representative of the hydrogenous matter content of the formation; and
indicating a property of an earth formation characterized by said normalized signal.

9. A method according to claim 8 wherein said inelastic gamma radiation is observed over an energy band of from about 0.5 Mev to about 7.0 Mev.

10. A method according to claim 8 wherein said indicating step comprises converting said normalized inelastic gamma radiation signal, in accordance with a previously established relationship relating such inelastic gamma radiation signals to known values of formation porosity, to an output signal indicative of the porosity of the formation.

11. A system for computing hydrogenous and neutron properties in an earth formation which has been irradiated with pulses of high energy neutrons comprising:
a source of signals that characterize the neutron induced gamma radiation activity over a broad energy band in the earth formation during at least the neutron pulses;
circuit means for measuring that portion of said characterizing signals that generally reflect inelastic neutron scattering gamma rays produced during an early part of said neutron pulses and for generating output signals in response thereto;
normalizing means for compensating said output signals for variations in the strength of said neutron pulses to provide signals that are more nearly indicative of the hydrogenous properties of the earth formation; and
hydrogenous property computation means for converting said normalized signals into output signals that are directly related to the hydrogenous character of the earth formation.

12. A system according to claim 11 wherein:
said circuit means further comprises means for measuring a portion of said characterizing signals that generally reflect thermal neutron capture gamma radiation and for generating output signals in response thereto; and
said normalizing means responds to said thermal neutron gamma radiation output signals and to said inelastic gamma ray output signals for compensating said inelastic gamma ray output signals for variations in said neutron pulse strength.

13. A system according to claim 11 wherein said computation means includes means for generating an output that is directly related to the porosity of the earth formation.

14. A system for logging thermal neutron absorption and porosity characteristics of an earth formation penetrated by a borehole comprising:
a housing for passage through the borehole;
a neutron generator within said housing for producing pulses of high-energy neutrons to irradiate the earth formation;
a gamma radiation detector within said housing and spaced from said generator for producing signals in response to a broad energy band of gamma radiation induced in the formation by said neutron pulses;
circuit means responsive to selected detector signals for producing an output signal representative of inelastic neutron scattering gamma rays that occur following the initiation of each neutron pulse but before the influence of thermal neutron absorption gamma radiation becomes predominant;
circuit means responsive to selected gamma radiation detector signals for producing signals that vary with the strength of the neutron generator;
normalization circuit means responsive to said inelastic scattering gamma signals and said neutron generator strength signals for producing an inelastic scattering signal that has been compensated for neutron generator strength fluctuation; and
further circuit means for converting said compensated signal into an output that is related to the earth formation porosity.

15. A method for observing earth formation properties comprising the steps of:
irradiating an earth formation with pulses of high-energy neutrons;
detecting over a wide energy band the gamma radiation produced by inelastic scattering of said neutrons by nuclei of the earth formation elements during the time interval commencing after the initiation of each neutron pulse and terminating before thermal neutron absorption gamma radiation becomes predominant and generating an output signal in response thereto; and
converting said inelastic gamma radiation output signal, in accordance with a previously established relationship relating such inelastic gamma radiation signals to the hydrogenous matter content of earth formations, to an output signal indicative of a characteristic of the formation under observation.

16. A method according to claim 15 further comprising the step of normalizing said inelastic gamma radiation output signal for variations in the strength of said neutron pulses.

17. A method according to claim 15 wherein said inelastic gamma radiation is detected over an energy band of from about 0.5 Mev to about 7.0 Mev.

18. A method according to claim 15 wherein the time interval during which said inelastic scattering gamma radiation is detected is early in each neutron pulse and is of a duration not greater than 10 μsec.

19. A method for observing earth formation properties, comprising the steps of:
repetitively irradiating an earth formation with pulses of high-energy neutrons;
observing over a broad energy band the gamma radiation produced by inelastic scattering of said neutrons by nuclei of the earth formation during a first time interval commencing with or after the initiation of each neutron pulse and terminating before thermal neutron absorption gamma radiation becomes predominant and generating a signal representative thereof;
observing radiation produced by the interaction of said neutrons with the formation nuclei during a second time interval commencing with or after the initiation of each neutron pulse and generating a signal in response thereto that is representative of the strength of the neutron pulses; and
combining said inelastic gamma radiation signal and said neutron pulse strength signal to normalize said inelastic gamma radiation signal for variations in the neutron pulse strength.

20. The method of claim 19 wherein said first time interval comprises the first 10 $\mu$sec or less of the neutron pulse.

21. The method of claim 19 wherein said second time interval commences after the termination of each neutron pulse and terminates prior to the initiation of the next successive neutron pulse.

22. The method of claim 19 wherein the radiation observed during said second time interval is predominantly gamma radiation resulting from the capture of thermal neutrons by formation nuclei.

23. The method of claim 19 wherein said second time interval is substantially coincident in time of occurrence and duration with the associated neutron pulse.

24. The method of claim 19 further comprising the steps of:
deriving a measurement of a characteristic of the formation in response to neutron-induced radiation from the formation;
controlling the time of occurrence and the duration of each neutron pulse as a function of said formation characteristic measurement; and
controlling the time of occurrence and the duration of said second time interval as a function of said formation characteristic measurement.

25. A system for observing earth formation properties, comprising:
means for repetitively irradiating an earth formation with pulses of high-energy neutrons;
means responsive over a broad energy band for measuring the gamma radiation produced by inelastic scattering of said neutrons by nuclei of the earth formation during a first time interval commencing with or after the initiation of each neutron pulse and terminating before thermal neutron gamma radiation become predominant and for generating a signal representative thereof;
means responsive to radiation produced by the interaction of said neutrons with formation nuclei during a second time interval commencing with or after the initiation of each neutron pulse and for generating a signal in response thereto that is representative of the strength of the neutron pulses; and
means for combining said gamma radiation measurement signal and said neutron pulse strength signal to normalize said gamma radiation measurement signal for variations in the neutron pulse strength.

26. The system of claim 25 wherein said second time interval commences after the termination of each neutron pulse and terminates prior to the initiation of the next successive neutron pulse.

27. The system of claim 25 wherein said second time interval is substantially coincident in time of occurrence and duration with the associated neutron pulse.

28. The system of claim 25 further comprising:
means responsive to neutron-induced radiation from the formation for deriving a measurement of a characteristic of the formation;
means for controlling the time of occurrence and duration of each neutron pulse as a function of said formation characteristic measurement; and
means for controlling the time of occurrence and the duration of said second time interval as a function of said formation characteristic measurement.

* * * * *

Disclaimer 3,833,809.—*Ralph G. Beil*, Houston, Tex. NEUTRON LOGGING OF FORMATION POROSITY AND CHLORINITY. Patent dated Sept. 3, 1974. Disclaimer filed May 2, 1980, by the assignee, *Schlumberger Technology Corporation*.

Hereby enters this disclaimer to claims 1-28, inclusive, of said patent.

[*Official Gazette, June 17, 1980.*]